United States Patent
Lee et al.

(10) Patent No.: US 11,644,567 B2
(45) Date of Patent: May 9, 2023

(54) DISTANCE MEASURING DEVICE FOR VEHICLE

(71) Applicant: HYUNBO Corporation, Cheonan-si (KR)

(72) Inventors: Yu-Hwan Lee, Cheonan-si (KR); Young-Woo Lee, Cheonan-si (KR)

(73) Assignee: HYUNBO CORPORATION, Cheonan-si (KR)

( * ) Notice: Subject to any disclaimer, the term of this patent is extended or adjusted under 35 U.S.C. 154(b) by 139 days.

(21) Appl. No.: 17/220,041

(22) Filed: Apr. 1, 2021

(65) Prior Publication Data

US 2021/0311184 A1  Oct. 7, 2021

(30) Foreign Application Priority Data

Apr. 1, 2020  (KR) .......................... 10-2020-0039976

(51) Int. Cl.
*G01S 13/931* (2020.01)
*G01S 7/282* (2006.01)
*G01S 7/288* (2006.01)

(52) U.S. Cl.
CPC ............ *G01S 13/931* (2013.01); *G01S 7/282* (2013.01); *G01S 7/288* (2013.01); *G01S 2013/9314* (2013.01)

(58) Field of Classification Search
CPC ........ G01S 13/931; G01S 7/282; G01S 7/288; G01S 2013/9314; B60Q 1/0023
See application file for complete search history.

(56) References Cited

U.S. PATENT DOCUMENTS

| 11,054,514 | B2* | 7/2021 | Mitchell | ................. E05F 15/73 |
| 2012/0112976 | A1* | 5/2012 | Hayakawa | ............ H01Q 9/045 |
| | | | | 343/843 |
| 2019/0016254 | A1* | 1/2019 | Salter | .................... B60Q 1/0023 |
| 2019/0162822 | A1* | 5/2019 | Rafrafi | ..................... E05F 15/73 |
| 2020/0088839 | A1* | 3/2020 | Miu | ......................... G01S 13/04 |
| 2020/0101887 | A1* | 4/2020 | Cha | ....................... H01Q 9/0407 |
| 2020/0271295 | A1* | 8/2020 | Miu | ........................ F21S 41/29 |
| 2021/0284098 | A1* | 9/2021 | Scott | ....................... B60R 25/30 |

(Continued)

FOREIGN PATENT DOCUMENTS

FR   3088597 A1 *  5/2020  ........... B60Q 1/0023
KR   10-2007-0064430 A   6/2007

(Continued)

OTHER PUBLICATIONS

17220041_2022-10-12_KR_20070064430_A_M.pdf, machine translation of KR_20070064430_A (Year: 2007).*

(Continued)

*Primary Examiner* — Erin F Heard
*Assistant Examiner* — Kenneth W Good
(74) *Attorney, Agent, or Firm* — Hauptman Ham, LLP (57) ABSTRACT

The present disclosure discloses a distance measuring device for a vehicle. The distance measuring device for the vehicle of the present disclosure includes a fixing portion to be mounted on an outer surface of the vehicle; and a sensor portion which is installed in the fixing portion, irradiates a radio wave to the outside of the vehicle, receives the radio wave from the outside of the vehicle, measures a distance between an object of the outside of the vehicle and the vehicle, or detects the object.

11 Claims, 9 Drawing Sheets

(56) References Cited

U.S. PATENT DOCUMENTS

| | | | | |
|---|---|---|---|---|
| 2021/0285614 A1* | 9/2021 | Hellin Navarro | ....... | F21S 43/14 |
| 2021/0387563 A1* | 12/2021 | Junghähnel | ........... | G01S 13/931 |

FOREIGN PATENT DOCUMENTS

| | | | | |
|---|---|---|---|---|
| KR | 20070064430 A | * | 6/2007 | |
| KR | 20070064430 A | * | 6/2007 | |
| KR | 10-2019-0081308 A | | 7/2019 | |

OTHER PUBLICATIONS

17220041_2022-10-12_FR_3088597_A1_M.pdf, machine translation of FR_3088597_A1 (Year: 2020).*

Korean Office Action dated May 21, 2021, in connection with the Korean Patent Application No. 10-2020-0039976.

* cited by examiner

DISTANCE MEASURING DEVICE FOR VEHICLE

CROSS-REFERENCE TO RELATED APPLICATION

The present disclosure claims priority to and the benefit of Korean Patent Application No. 2020-0039976, filed on Apr. 1, 2020, the disclosure of which is incorporated herein by reference in its entirety.

BACKGROUND

1. Field of the Invention

The present disclosure relates to a distance measuring device for a vehicle, and more specifically, relates to the distance measuring device for the vehicle in which a sensor for measuring a distance is installed in a structure installed on an outer surface of the vehicle.

2. Description of Related Art

Generally, radar for the vehicle is strong against environmental elements such as contamination and whether compared to other sensors for the vehicle to prevent collision, and is capable of abstracting information about a distance of a target, an angle, and speed at the same time. Also, relatively stable detection is possible even with respect to the target existing at a relatively long distance.

The radar for the vehicle has been rapidly minimized according to integration based on SiGe and CMOS due to development of a semiconductor technology, improvement in an operating frequency, and development of a signal processing technology. Also, the radar for the vehicle has been developed as integrated, high resolution radar for integrally detecting long and short distances using single radar, and for identifying objects, i.e., the vehicle, pedestrians, and various obstacles on a road.

Conventionally, in order to install the distance measuring device for the vehicle using radar, an additional structure should be installed on an outer surface of the vehicle. Accordingly, there are problems such that a production cost increases and a fine appearance may not be provided. Therefore, there is need to improve the above.

A background art of the present disclosure is disclosed in KR No. 10-2019-0081308A (published on Jul. 9, 2019, TITLE OF THE INVENTION: A Distance Measuring Method Using Images And Vehicle Controlling Method Thereof).

SUMMARY OF THE INVENTION

The present disclosure is for providing the distance measuring device for the vehicle, wherein a sensor portion for measuring a distance is installed in an existing installed structure for the vehicle.

Also, the present disclosure is for providing the distance measuring device for the vehicle which is capable of easily measuring an object located in a lateral direction of the vehicle or a space for parking the vehicle.

Also, the present disclosure is for providing the distance measuring device for the vehicle in which a fine appearance may be provided since there is no need to install the additional structure so as to install the sensor portion for measuring a distance.

Objectives of the present disclosure are not limited to the above-described ones. Additionally, other objectives and advantages of the present disclosure that have not been mentioned may be clearly understood from the following description and may be more clearly understood from embodiments. Further, it will be understood that the objectives and advantages of the present disclosure may be realized by means and combinations thereof that are described in the appended claims.

According to the present disclosure, the distance measuring device for the vehicle includes a fixing portion to be mounted on an outer surface of the vehicle; and a sensor portion which is installed in the fixing portion, irradiates a radio wave to the outside of the vehicle, receives the radio wave from the outside of the vehicle, measures a distance between an object of the outside of the vehicle and the vehicle, or detects the object.

Also, the fixing portion includes a garnish or a turn signal display portion to be installed on the outer surface of the vehicle.

Also, the fixing portion includes a first base portion which is fixed to the vehicle and includes an inner space of which one side is open; a first cover portion which is fixed to one side of the first base portion; a printed circuit board (PCB)-substrate portion which is installed in an inner space formed by the first base portion and the first cover portion, and on which a circuit is printed; and a light emitting portion which is connected to the PCB-substrate portion, and irradiates light to the outside of the first cover portion. The sensor portion includes a first sensor portion which is installed on the PCB-substrate portion, irradiates the radio wave to the outside of at least any one of the first base portion and the first cover portion, or receives the radio wave therefrom.

Also, the first cover portion is formed by a light transmitting material.

Also, the light emitting portion is a turn signal lamp and uses a light emitting diode (LED).

Also, the first sensor portion includes an antenna for transmitting and receiving included in radar.

Also, the fixing portion includes a second base portion which is fixed to the vehicle and includes an inner space of which one side is open; a second cover portion which is fixed to one side of the second base portion; a printed circuit board (PCB)-substrate portion which is installed in an inner space formed by the second base portion and the second cover portion, and on which a circuit is printed; and a light emitting portion which is connected to the PCB-substrate portion, and irradiates light to the outside of the second cover portion.

Also, the sensor portion includes a second sensor portion which is installed in the second cover portion, irradiates the radio wave to the outside of at least any one of the second base portion and the second cover portion, or receives the radio wave therefrom.

Also, the second cover portion is formed by a light transmitting material.

Also, the second sensor portion includes an antenna for transmitting and receiving included in radar.

Also, the fixing portion includes a third base portion which is fixed to the vehicle and has a plate shape; and a third cover portion which surrounds one side of the third base portion to be fixed thereto.

Also, the sensor portion includes a third sensor portion which is fixed to a side of the third base portion facing the third cover portion, irradiates the radio wave to the outside of the third cover portion, or receives the radio wave therefrom.

Also, the third base portion and the third cover portion are extended in a longitudinal direction, and are used as the garnish to be installed on a door or a fender.

According to the present disclosure, the distance measuring device for the vehicle is installed in a conventional structure including the garnish and the turn signal display portion installed on the outer surface of the vehicle. Therefore, the cost for installing the distance measuring device for the vehicle may be reduced.

Also, according to the present disclosure, the sensor portion is capable of easily measuring the object located in the lateral direction of the vehicle or the space for parking the vehicle. Therefore, occurrence of safety accidents may be reduced.

Also, according to the present disclosure, the fine appearance may be provided since there is no need to install the additional structure so as to install the sensor portion.

In addition to the above effects, specific effects of the present disclosure will be described while describing detailed matters for implementing embodiments of the invention hereinafter.

DETAILED DESCRIPTION OF EXEMPLARY EMBODIMENTS

The pre-described objectives, features, and advantages will be described specifically hereinafter referring to the attached drawings. Therefore, those skilled in the art can easily realize the technical sprit of the present disclosure. In describing the disclosure, the detailed description of known technologies in relation to the disclosure is omitted if it is deemed to make the gist of the present disclosure unnecessarily vague. Hereinafter, referring to the attached drawings, a preferred embodiment according to the present disclosure is explained specifically. Throughout the drawings, identical reference numerals denote identical or similar components.

Even though the terms such as "first", and "second" are used for describing various components, the components should not be limited by the terms. The terms are used in order to distinguish one component from another component. It should be understood that if there is no particular description, which is opposite to the above, a first component may be a second component.

Hereinafter, when any component is described as being "at an upper portion (or a lower portion)" of a component, or "on (or under)" a component, any component may be placed on the upper surface (or the lower surface) of the component, and an additional component may be interposed between the component and any component placed on (or under) the component.

When a component is described as being "connected," "coupled" or "linked" to another component, the component may be directly connected or able to be linked to another component; however, it is also to be understood that an additional component may be "interposed" between the two components, or the two components may be "connected," "coupled" or "linked" through an additional component.

In a whole of specification, each component may be singular or plural as long as there is no description, which is particularly opposite to the above.

A singular expression used in this specification includes a plural expression as long as the expression is not definitely differently indicated in the context. In the present application, the term "configure" or "include", etc. should not be construed to necessarily include all of various components or various steps described in specification. It should be construed such that some components or some steps of the above may not be included, or additional components or steps may be further included.

In the whole of specification, when the term "A and/or B" is used, the term means A, B or A and B as long as there is no description, which is particularly opposite to the above. When the term "C to D" is used, the term means C or more and D or less as long as there is no description, which is particularly opposite to the above.

Hereinafter, the distance measuring device for the vehicle according to some examples of the present disclosure will be described.

Figure 1:
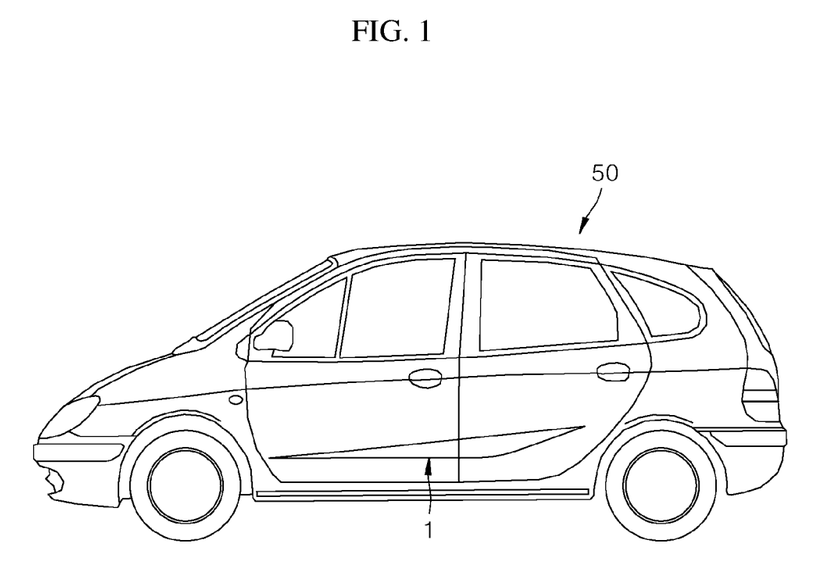
FIG. 1 is a drawing for showing a state that the distance measuring device for the vehicle according to a first example of the present disclosure is installed on the outer surface of the vehicle.
Figure 2:
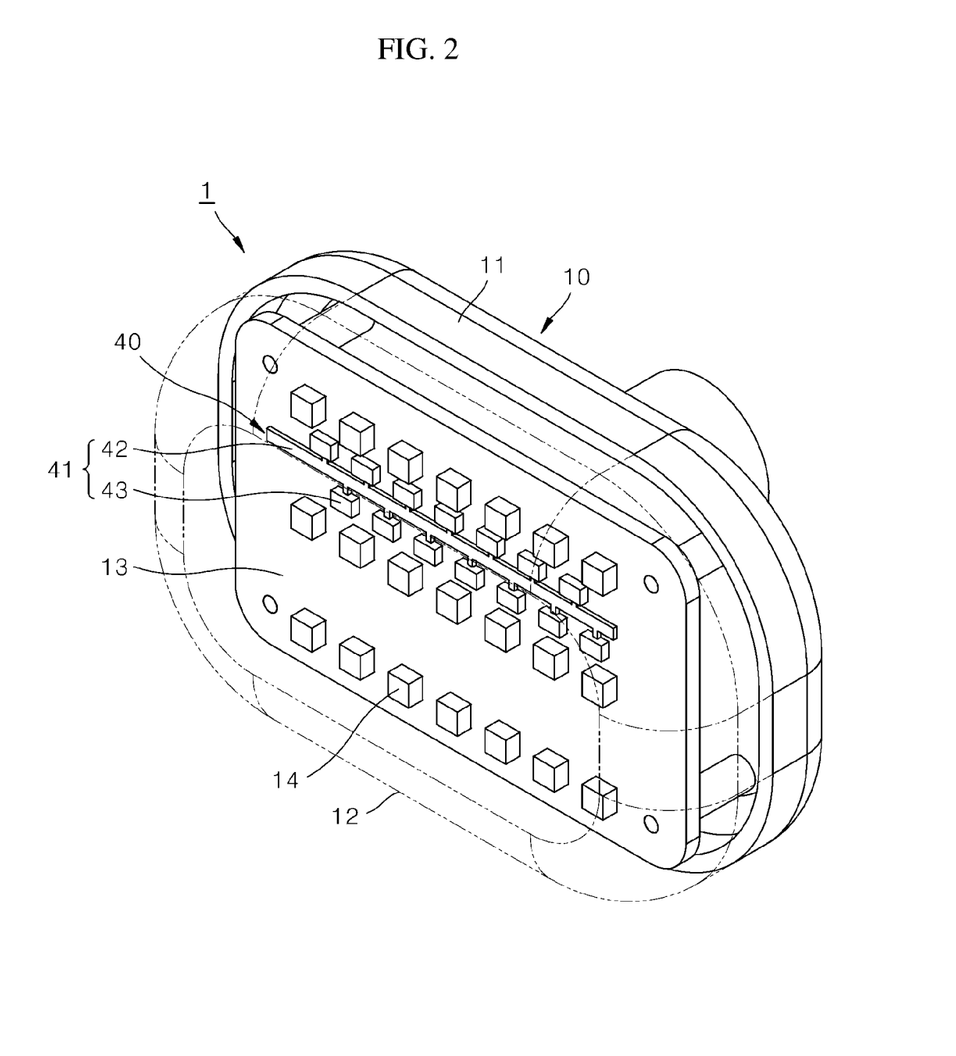
FIG. 2 is a perspective view for showing the distance measuring device for the vehicle according to the first example of the present disclosure.
Figure 3:
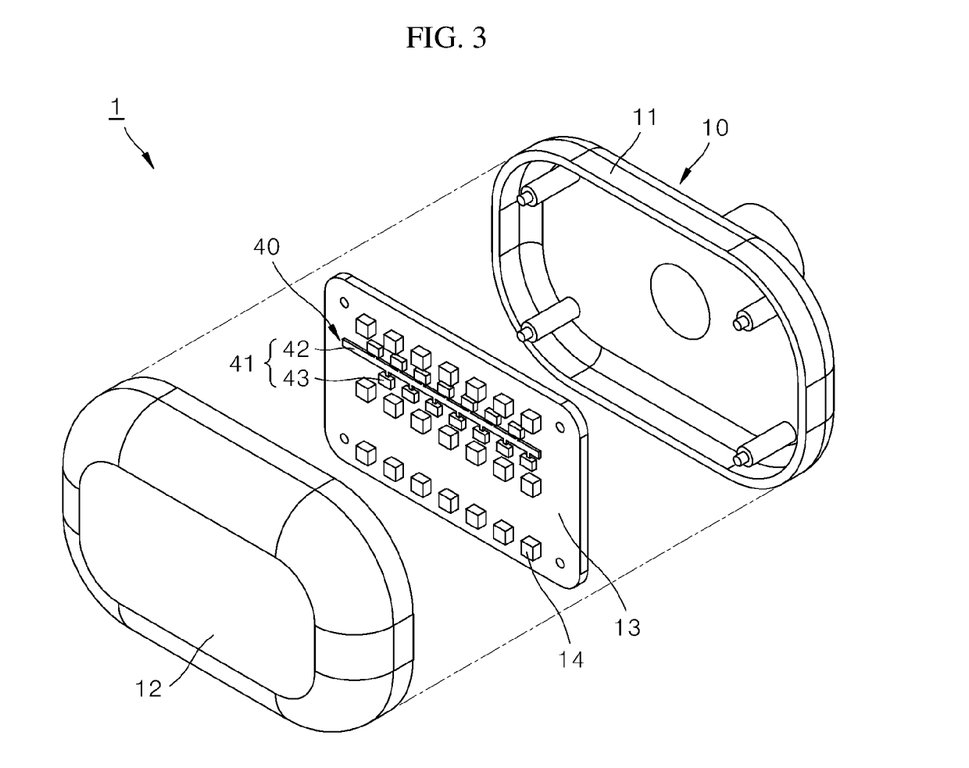
FIG. 3 is a front view of the distance measuring device for the vehicle according to the first example of the present disclosure.
Figure 4:
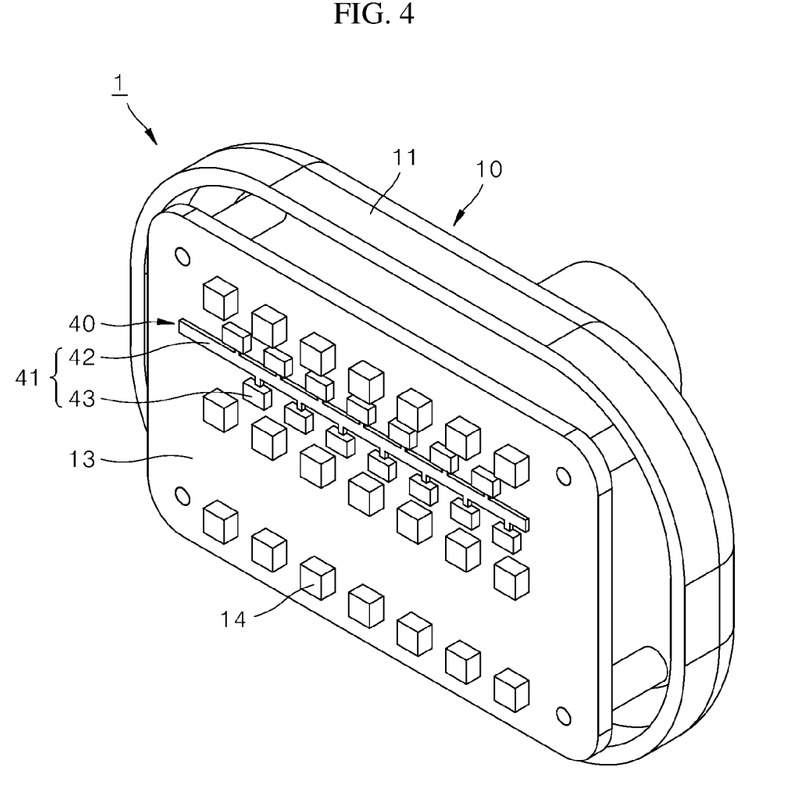
FIG. 4 is a perspective view for showing a state that a printed circuit board (PCB)-substrate portion according to the first example of the present disclosure is installed.
Figure 5:
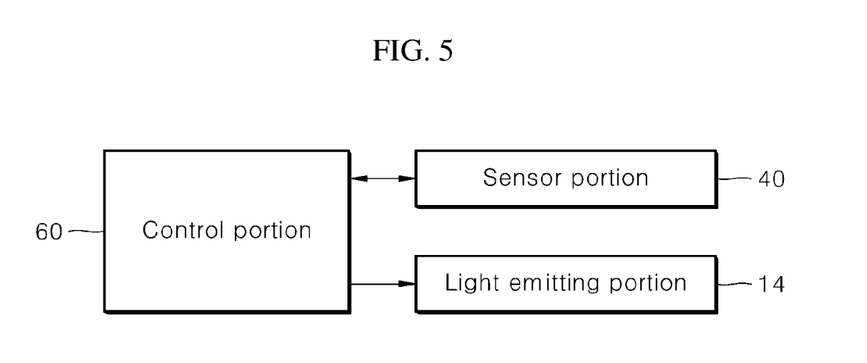
FIG. 5 is a block diagram of the distance measuring device for the vehicle according to the first example of the present disclosure.

FIG. 1 is a drawing for showing a state that the distance measuring device for the vehicle 1 according to a first example of the present disclosure is installed on the outer surface of the vehicle 50. FIG. 2 is a perspective view for showing the distance measuring device for the vehicle 1 according to the first example of the present disclosure. FIG. 3 is a front view of the distance measuring device for the vehicle 1 according to the first example of the present disclosure. FIG. 4 is a perspective view for showing a state that a printed circuit board (PCB)-substrate portion 13 according to the first example of the present disclosure is installed. FIG. 5 is a block diagram of the distance measuring device for the vehicle 1 according to the first example of the present disclosure.

As shown in FIGS. 1 to 5, the distance measuring device for the vehicle 1 according to the first example of the present disclosure includes a fixing portion 10 to be mounted on an outer surface of the vehicle 50; and a sensor portion 40 which is installed in the fixing portion 10, irradiates a radio wave to the outside of the vehicle 50, receives the radio wave from the outside of the vehicle 50, measures a distance between an object of the outside of the vehicle 50 and the vehicle 50, or detects the object. The sensor portion 40 may include at least any one of a first sensor portion 41, a second sensor portion 44, and a third sensor portion 47.

The fixing portion 10 may include a garnish or a turn signal display portion to be installed on the outer surface of the vehicle 50. The fixing portion 10 may be integrally formed in the garnish or the turn signal display portion. Also, the fixing portion 10 may be formed in a shape such as the garnish or the turn signal display portion to be installed in the vehicle 50. Therefore, the distance measuring device for the vehicle 1 according to the first example of the present disclosure may have the shape and functions such as the garnish or the turn signal display portion to be installed in the conventional vehicle 50, and also may detect an object or a space of the outside of the vehicle 50.

The fixing portion 10 according to the first example of the present disclosure may include a first base portion 11, a first cover portion 12, a printed circuit board (PCB)-substrate portion 13, and a light emitting portion 14.

The first base portion 11 is fixed to the vehicle 50 and includes an inner space of which one side is open. There may be various modifications within the technical spirit. The first base portion 11 according to the first example of the present disclosure has a shape such as a case of the turn signal display portion. A tubular shape protruding from one side (a right side in a criterion of FIG. 3) of the first base portion 11 is inserted into an inside of the vehicle 50 to be fixed thereto. Further, the other side (a left side in a criterion of FIG. 3) of the first base portion 11 has an inner space for installing the PCB-substrate portion 13 and the sensor portion 40.

The first cover portion 12 is fixed to open one side of the first base portion 11. The first cover portion 12 is formed by a light transmitting material. Therefore, light of the light emitting portion 14 installed between the first cover portion 12 and the first base portion 11 may be irradiated to the outside of the first cover portion 12 through the first cover portion 12.

The PCB-substrate portion 13 may be installed in an inner space formed by the first base portion 11 and the first cover portion 12, and on which a circuit is printed. According to the first example of the present disclosure, the PCB-substrate portion 13 may have a quadrilateral panel shape, and may be fixed to the first base portion 11.

The light emitting portion 14 may be connected to the PCB-substrate portion 13 and irradiates light to the outside of the first cover portion 12. There may be various modifications within the technical spirit. According to the first example of the present disclosure, the light emitting portion 14 may be used as a turn signal lamp. The light emitting portion 14 may use a light emitting diode (LED), and may use a light bulb as required.

The sensor portion 40 is installed on the PCB-substrate portion 13, irradiates the radio wave to the outside of at least any one of the first base portion 11 and the first cover portion 12, or receives the radio wave therefrom. There may be various modifications within the technical spirit. According to the first example of the present disclosure, the first sensor portion 41 includes a sensor connecting portion 42 which is fixed to the PCB-substrate portion 13, is extended along a longitudinal direction of the PCB-substrate portion 13, and is made of a conductive material; and measuring sensors 43 which are located at both sides of the sensor connecting portion 42, transmit the radio wave to the outside of the first cover portion 12, and receive an irradiated radio wave from the outside of the first cover portion 12 to the inside of the first cover portion 12.

The sensor connecting portion 42 has functions for connecting a plurality of measuring sensors 43, and is extended in a straight-line direction. The sensor connecting portion 42 is made of the conductive material. There may be various modifications such that a metal thin film may be used as the sensor connecting portion 42. The sensor connecting portion 42 of the present disclosure may be installed in a horizontal direction along a longitudinal direction of the PCB-substrate portion 13.

The plurality of measuring sensors 43 may be alternately installed in shifts at both sides of the sensor connecting portion 42. The measuring sensors 43 are installed in a zigzag direction in a center of the sensor connecting portion 42 extended in a straight-line direction. Therefore, an interference phenomenon by adjacent measuring sensors 43 may be maximally prevented, and a number of measuring sensors 43 may be installed even in a relatively narrow space.

When the sensor connecting portion 42 is installed in a horizontal direction, the measuring sensors 43 may be installed on upper and lower sides of the sensor connecting portion 42 and may be installed in a zigzag shape.

If the sensor connecting portion 42 is installed in a vertical direction, the measuring sensors 43 may be installed on left and right sides of the sensor connecting portion 42 and may be installed in the zigzag shape.

The measuring sensors 43 may include a transmitting antenna element for transmitting a transmit signal, and a receiving antenna element for receiving a reception signal according to reflection of the transmit signal. Also, the measuring sensors 43 may further include a communication element for processing the transmit signal and the reception signal.

The first sensor portion 41 including the sensor connecting portion 42 and the measuring sensors 43 may include an antenna for transmitting and receiving included in radar. The first sensor portion 41 may include a transmit receive module and a signal processing module for measuring a distance and a space by using a radar method. The measuring sensors 43 may perform each function of an antenna for transmitting and an antenna for receiving.

Speed, resolution, and precision of the first sensor portion 41 using a radar method are inversely proportional to a radio frequency (RF). Therefore, if a RF-frequency is high, speed, resolution, and precision may be improved. For example, speed, resolution, and precision of a 77 GHz sensor are 3 times excellent than those of a 24 GHz sensor.

If the radar method is applied to the first sensor portion 41, the method applied to the first sensor portion 41 may be roughly divided into two methods according to a modulating method of a laser signal. In advance, a lidar device for the vehicle of a Time of Flight (ToF) method measures a distance by measuring a time until a laser pulse signal is reflected from an object within a measuring range and arrives at a receiver. The ToF method is also referred to as a direct method or an Incoherent Detection method.

Also, a Phase Shift (PS) method may be applied to the lidar for the vehicle to be used in the first sensor portion 41. Here, the PS method measures a distance by having a specific frequency, emitting a laser beam, which is successively modulated, and measuring an amount of phase modulation of the laser signal reflected from the object. The PS method is also referred to as an indirect method or a Coherent Detection method.

According to the first example of the present disclosure, the distance measuring device for the vehicle 1 is configured as a structure integrated with a side turn signal lamp or the garnish, and may be used for detecting the object located at the side of the vehicle 50.

Hereinafter, referring to attached drawings, an operation state of the distance measuring device for the vehicle 1 according to the first example of the present disclosure will be specifically described.

When the vehicle 50 is going to turn left or turn right, a turn signal lamp flickers and also, the light emitting portion 14 receiving a control signal from a control portion 60 flickers. Light of the light emitting portion 14 is irradiated to the outside through the first cover portion 12 to operate as the turn signal lamp for the vehicle.

Also, if the first sensor portion 41 installed on the PCB-substrate portion 13 operates, the first sensor portion 41 measures a distance between an object located at the outside of the vehicle 50 and the vehicle 50 and then, transmits a measured value to the control portion 60.

Information measured in the first sensor portion 41 is transmitted to the control portion 60 so that the control portion 60 may calculate space information for automatic parking based on the measured value of the first sensor portion 41. Also, the control portion 60 detects the object located at the outside of the door of the vehicle 50 upon opening and closing the door for the vehicle to send a warning message to a passenger, or to control movement of the door of the vehicle 50. Therefore, occurrence of safety accidents may be prevented.

Also, if the first sensor portion 41 detects the object located at the opposite of the side of the vehicle 50, or measures a distance between the vehicle 50 and the object to transmit the measured value to the control portion 60, the control portion 60 may send a warning message to a driver or a passenger.

Hereinafter, referring to drawings, the distance measuring device for the vehicle 3 according to a second example of the present disclosure will be described.

For convenience of the description, components of which configuration and action are the same as those of the first example of the present disclosure will be cited by the same reference numerals. The detailed description thereof will be omitted.

Figure 6:
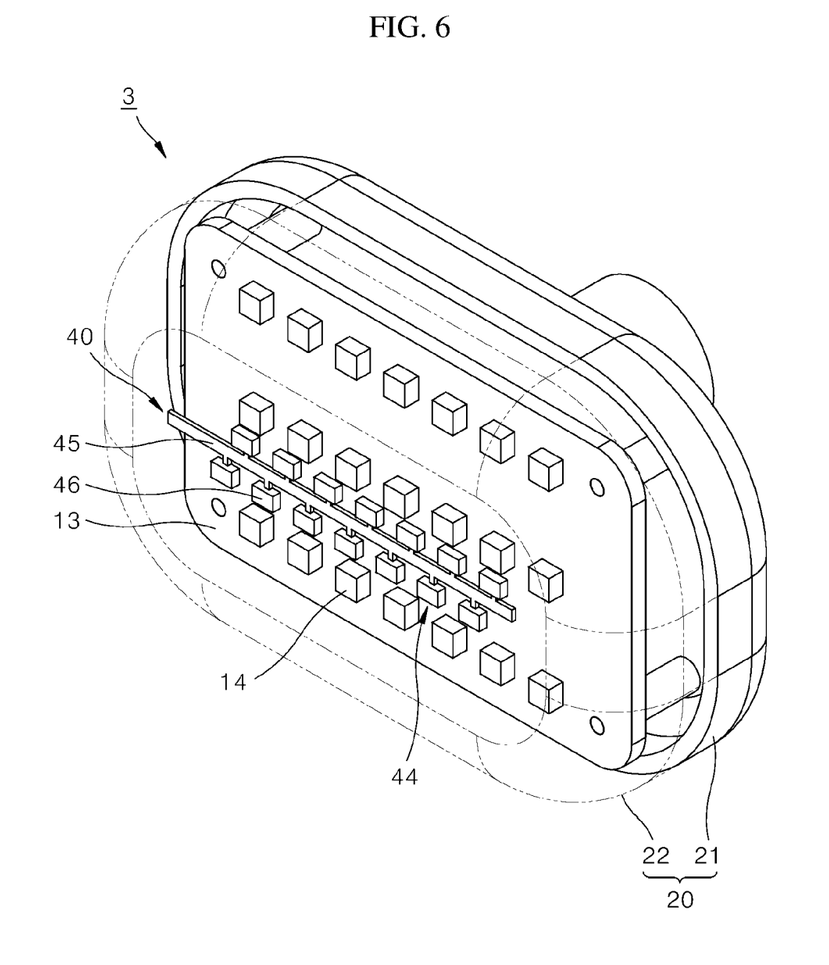
FIG. 6 is a perspective view for showing the distance measuring device for the vehicle according to a second example of the present disclosure.
Figure 7:
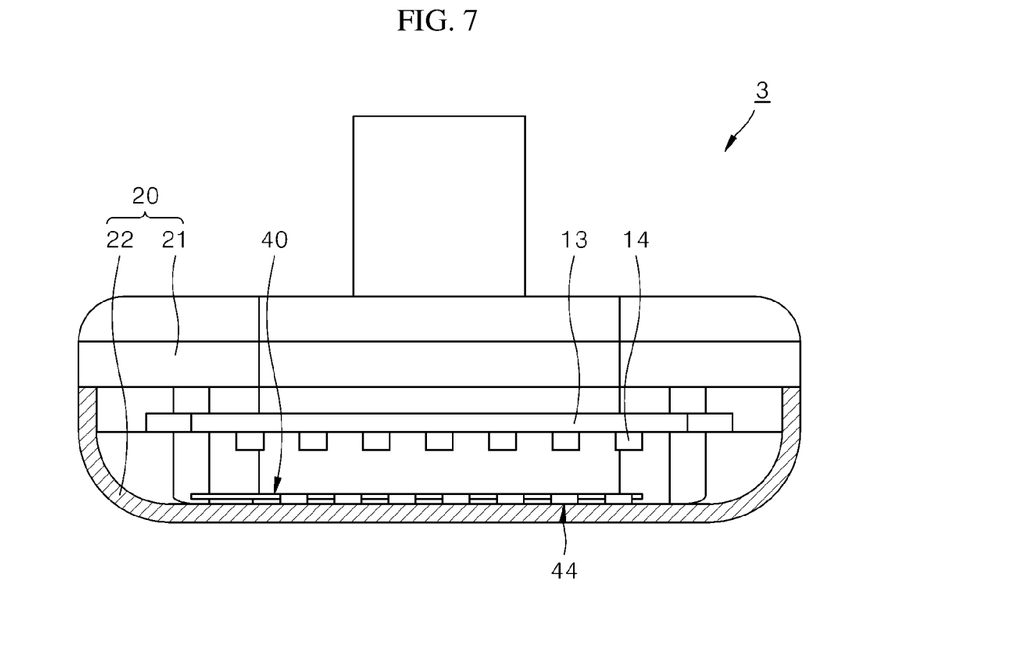
FIG. 7 is a top plan view for showing the distance measuring device for the vehicle according to the second example of the present disclosure.
Figure 8:
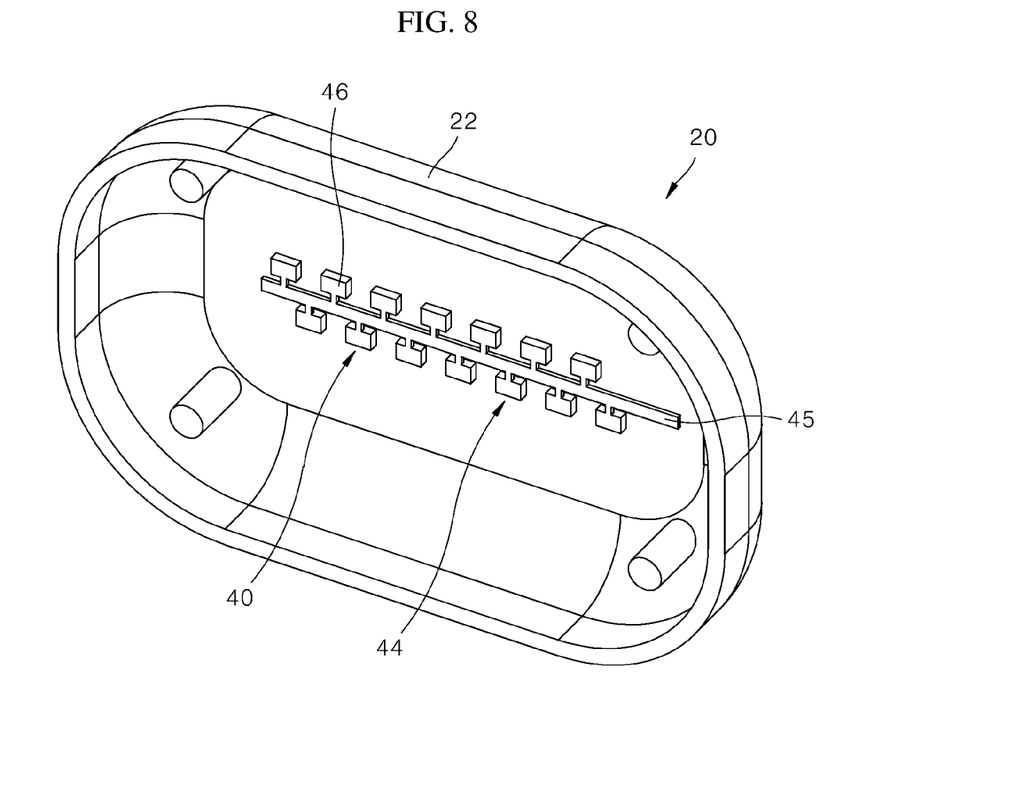
FIG. 8 is a perspective view for showing a second sensor portion installed in a second cover portion according to the second example of the present disclosure.

FIG. 6 is a perspective view for showing the distance measuring device for the vehicle 3 according to a second example of the present disclosure. FIG. 7 is a top plan view for showing the distance measuring device for the vehicle 3 according to the second example of the present disclosure. FIG. 8 is a perspective view for showing a second sensor portion 44 installed in a second cover portion 22 according to the second example of the present disclosure.

As shown in FIGS. 6 to 8, the distance measuring device for the vehicle 3 according to the second example of the present disclosure includes the fixing portion 20 and the sensor portion 40.

The fixing portion 20 according to the second example of the present disclosure may include the second base portion 21, the second cover portion 22, the PCB-substrate portion 13, and the light emitting portion 14.

The second base portion 21 is fixed to the vehicle 50 and includes an inner space of which one side is open. There may be various modifications within the technical spirit. According to the second example of the present disclosure, the second base portion 21 has a shape such as a case of a turn signal display portion. A tubular shape protruding from one side (an upper side in a criterion of FIG. 7) of the second base portion 21 is inserted into an inside of the vehicle 50 to be fixed thereto. Further, the other side (a lower side in a criterion of FIG. 7) of the second base portion 21 has an inner space for installing the PCB-substrate portion 13 and the sensor portion 40.

The second cover portion 22 is fixed to open one side of the second base portion 21. The second cover portion 22 is formed by a light transmitting material. Therefore, light of the light emitting portion 14 installed between the second cover portion 22 and the second base portion 21 is irradiated to an outside of the second cover portion 22 through the second cover portion 22.

The PCB-substrate portion 13 is installed in an inner space formed by the second base portion 21 and the second cover portion 22, and on which a circuit is printed. According to the second example of the present disclosure, the PCB-substrate portion 13 may have a quadrilateral panel shape, and may be fixed to the second base portion 21.

The light emitting portion 14 is connected to the PCB-substrate portion 13, and irradiates light to the outside of the second cover portion 22. There may be various modifications within the technical spirit. According to the second example of the present disclosure, the light emitting portion 14 may be used as the turn signal lamp and may use LED. Also, the light emitting portion 14 may use a light bulb as required.

The sensor portion 40 is installed at the second cover portion 22. Preferably, the sensor portion 40 is installed at the inside of the second cover portion 22. Also, the second cover portion 44 irradiates the radio wave to the outside of at least any one of the second base portion 21 and the second cover portion 22, or receives the radio wave therefrom. There may be various modifications within the technical spirit.

According to the second example of the present disclosure, the second sensor portion 44 includes a sensor connecting portion 45 which is fixed to the second cover portion 22, and is extended along a longitudinal direction of the second cover portion 22; and measuring sensors 46 which are located at both sides of the sensor connecting portion 45, and transmit the radio wave to the outside of the second cover portion 22, or receive an irradiated radio wave from the outside of the second cover portion 22 to the inside of the second cover portion 22.

The second sensor portion 44 may include the antenna for transmitting and receiving included in radar.

The sensor connecting portion 45 has a function for connecting a plurality of measuring sensors 46 and is extended in a straight-line direction. The plurality of measuring sensors 46 may be alternately installed in shifts at both sides of the sensor connecting portion 45. The measuring sensors 46 are installed in a zigzag direction in a center of the sensor connecting portion 45 extended in a straight-line direction. Therefore, an interference phenomenon by adjacent measuring sensors 46 may be maximally prevented, and a number of measuring sensors 46 may be installed even in a relatively narrow space. The sensor connecting portion 45 may be made of a conductive material.

Also, the second sensor portion 44 operates in a radar method to measure a distance between the object located at the side of the vehicle and the vehicle. There may be various modifications of being capable of measuring a space located at the side of the vehicle as required, etc.

Configuration and an operation state of the second sensor portion 44 are the same as or similar with those of the first sensor portion 41. Therefore, the detailed description about the second sensor portion 44 will be omitted.

According to the second example of the present disclosure, the distance measuring device for the vehicle 3 is configured as a structure integrated with the side turn signal lamp or the garnish, and may be used for detecting an object of the side of the vehicle 50.

Hereinafter, referring to drawings, the distance measuring device for the vehicle 5 will be described according to a third example of the present disclosure.

For convenience of the description, components of which configuration and action are the same as those of the first example of the present invention will be cited by the same reference numerals. The detailed description thereof will be omitted.

Figure 9:
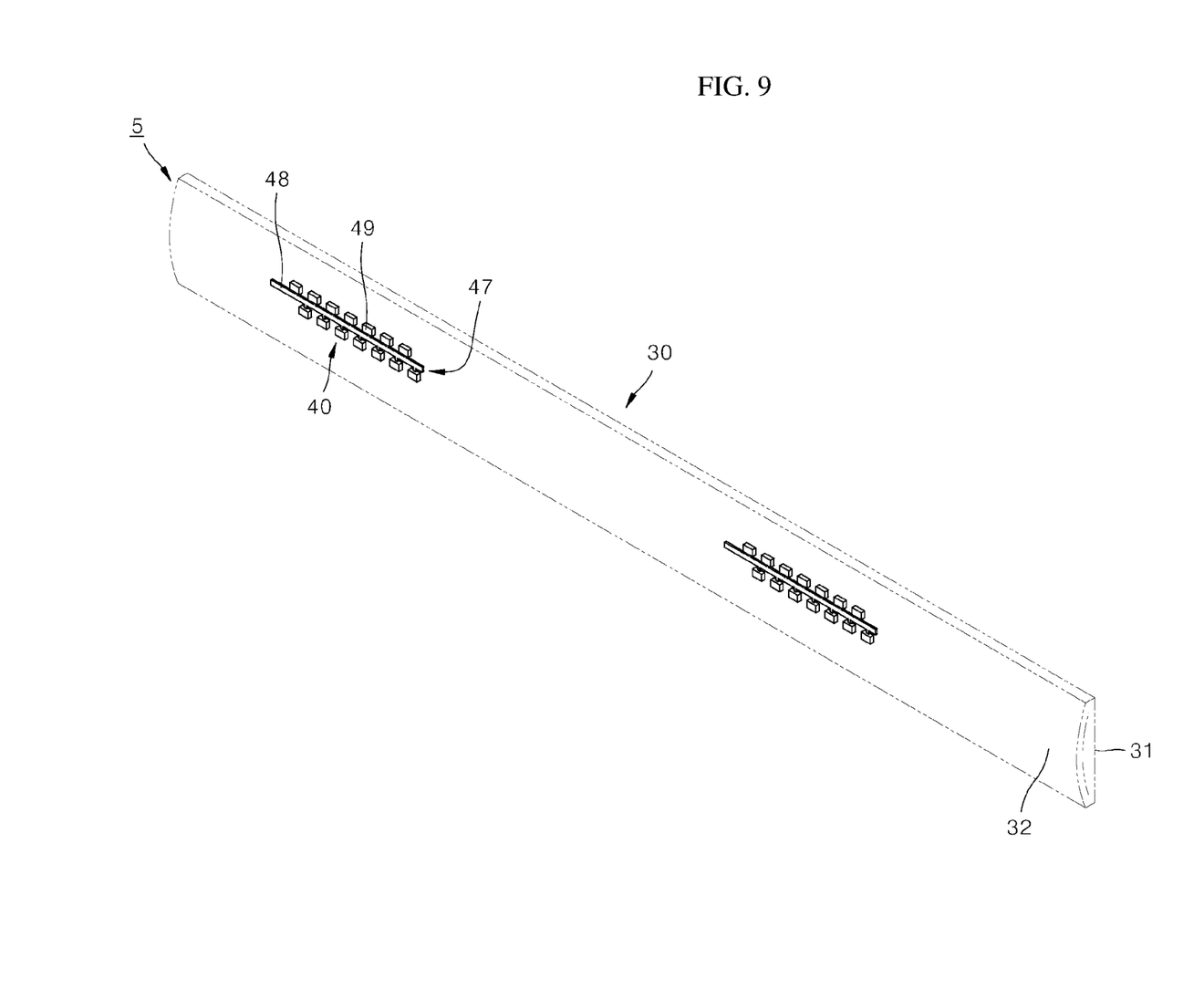
FIG. 9 is a perspective view for showing the distance measuring device for the vehicle according to a third example of the present disclosure.
Figure 10:
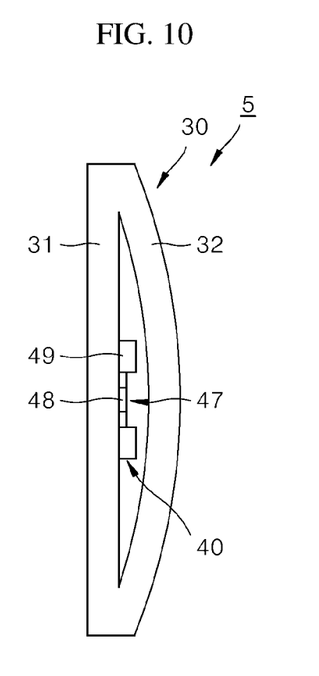
FIG. 10 is a front view of the distance measuring device for the vehicle according to the third example of the present disclosure.
Figure 11:
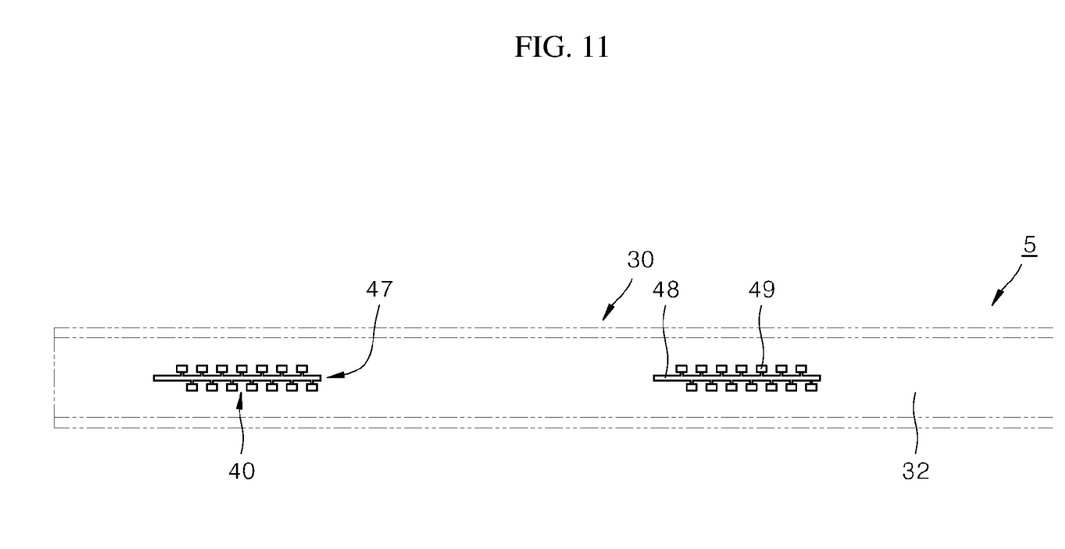
FIG. 11 is a side view of the distance measuring device for the vehicle according to the third example of the present disclosure.

FIG. 9 is a perspective view for showing the distance measuring device for the vehicle 5 according to a third example of the present disclosure. FIG. 10 is a front view of the distance measuring device for the vehicle 5 according to the third example of the present disclosure. FIG. 11 is a side view of the distance measuring device for the vehicle 5 according to the third example of the present disclosure.

As shown in FIGS. 9 to 11, the distance measuring device for the vehicle 5 according to the third example of the present disclosure may include the fixing portion 30 and the third sensor portion 47.

The fixing portion 30 may include a third base portion 31 which is fixed to the vehicle 50 and has a plate shape; and a third cover portion 32 which surrounds one side of the third base portion 31 to be fixed thereto. The third base portion 31 may be installed at a side or a rear surface of the vehicle 50 and may be installed in a straight-line direction. The third base portion 31 has a rectangular panel shape, and the third cover portion 32 may be installed in a shape of surrounding an outer surface of the third base portion 31.

The sensor portion 40 may include a third sensor portion 47 which is fixed to a side of the third base portion 31 facing the third cover portion 32, irradiates the radio wave to the outside of the third cover portion 32, or receives the radio wave therefrom.

The third sensor portion 47 may include an antenna for transmitting and receiving included in radar.

The sensor portion 40 may be installed at a third base portion 31, and preferably, the sensor portion 40 may be installed on an outer surface of the third base portion 31. Also, the third sensor portion 47 irradiates the radio wave to the outside of at least any one of the third base portion 31 and the third cover portion 32, or receives the radio wave therefrom. There may be various modifications within the technical spirit.

The third sensor portion 47 according to the third example of the present disclosure includes a sensor connecting portion 48 which is fixed to the third base portion 31, and is extended along a longitudinal direction of the third base portion 31; and measuring sensors 49 which are located at both sides of the sensor connecting portion 48, transmit the radio wave to the outside of the third cover portion 32, or receive an irradiated radio wave from the outside of the third cover portion 32 to the inside of the third cover portion 32.

The sensor connecting portion 48 has a function for connecting a plurality of measuring sensors 49 and is extended in a straight-line direction. The plurality of measuring sensors 49 may be alternately installed in shifts at both sides of the sensor connecting portion 48. The measuring sensors 49 are installed in a zigzag direction in a center of the sensor connecting portion 48 extended in a straight-line direction.

Therefore, an interference phenomenon by adjacent measuring sensors 49 may be maximally prevented, and a number of measuring sensors 49 may be installed even in a relatively narrow space.

Also, the third sensor portion 47 may operate in a radar method. Also, the third sensor portion 47 may include at least any one of a transmit receive module and a signal processing module. Configuration and an operation state of the third sensor portion 47 are the same as or similar with the first sensor portion 41. Therefore, the detailed description about the third sensor portion 47 will be omitted.

Meanwhile, the third base portion 31 and the third cover portion 32 according to the third example of the present disclosure are extended in a longitudinal direction, and are used as the garnish to be installed at the door or the fender.

As the above, according to the present disclosure, the distance measuring devices for the vehicle 1, 3, and 5 are installed in the conventional structure including the garnish and the turn signal display portion installed at the outer surface of the vehicle 50. Therefore, the coast for installing could be reduced. Also, the sensor portion 40 may easily measure an object located at a lateral direction of the vehicle 50 or a space for parking the vehicle, so that occurrence of the safety accidents may be reduced. Also, there is no need to install an additional structure for installing the sensor portion 40. Accordingly, a fine appearance may be provided.

As the above, the present disclosure is described by referring exemplary drawings, but it is obvious that the present disclosure is not limited by the disclosed embodiments and drawings. It is obvious that various modifications may be made by one having ordinary skill in the art within the scope of the technical spirit of the disclosure. Further, even though action and effects according to configuration of the present disclosure are not definitely described in the description of embodiments of the present disclosure, it is certain that predictable effects resulted from the relevant configuration should be also admitted.

DESCRIPTION OF SYMBOLS 1, 3, 5: Distance measuring device for a vehicle
10: Fixing portion
11: First base portion
12: First cover portion
13: Printed circuit board (PCB)-substrate portion
14: Light emitting portion
20: Fixing portion
21: Second base portion
22: Second cover portion
30: Fixing portion
31: Third base portion
32: Third cover portion
40: Sensor portion
41: First sensor portion
42: Sensor connecting portion
43: Measuring sensors
44: Second sensor portion
45: Sensor connecting portion
46: Measuring sensors
47: Third sensor portion
48: Sensor connecting portion
49: Measuring sensors
50: Vehicle
60: Control portion

What is claimed is:

1. A distance measuring device for a vehicle, comprising:
a fixed housing configured to be mounted on an outer surface of the vehicle; and a sensor unit installed in the fixed housing, portion, irradiates and configured to irradiate a radio wave to the outside of the vehicle, receive receives the radio wave reflected from the outside of the vehicle, and measure measures a distance between an object of the outside of the vehicle and the vehicle, or detects the object, wherein the fixed housing comprises: a first base housing having an inner space of which one side is open, and configured to be coupled to the vehicle; a first cover coupled to the one side of the first base housing; a printed circuit board (PCB) installed in the inner space of the first base housing; and a plurality of lighting lamps installed on the PCB and arranged in parallel along a longitudinal direction of the first base housing in two rows, and wherein the sensor unit comprises: a sensor connecting line fixed on the PCB, extended along the longitudinal direction of the PCB between the two rows of the lighting lamps, and made of a conductive material; and a plurality of sensors connected to the sensor connecting line on the PCB, arranged at both sides from the sensor connecting line in a zigzag manner between the two rows of the lighting lamps, and configured to irradiate the radio wave to the outside of the vehicle and receive the radio wave reflected from the outside of the vehicle.

2. The distance measuring device for the vehicle of claim 1, wherein the fixed housing is a garnish unit.

3. The distance measuring device for the vehicle of claim 1, wherein the first cover is formed by a light transmitting material.

4. The distance measuring device for the vehicle of claim 1, wherein the fixed housing is a turn signal display unit, and the fixed housing comprises a turn signal lamp installed on the PCB.

5. The distance measuring device for the vehicle of claim 1, wherein a sensor of the plurality of sensors includes a radar antenna.

6. A distance measuring device for a vehicle, comprising: a fixed housing configured to be mounted on an outer surface of the vehicle; and a sensor unit installed in the fixed housing, and configured to irradiate a radio wave to the outside of the vehicle, receive the radio wave reflected from the outside of the vehicle, and measure a distance between an object of the outside of the vehicle and the vehicle, wherein the fixed housing comprises: a first base housing having an inner space of which one side is open, and configured to be coupled to the vehicle; a first cover coupled to the one side of the first base housing; a printed circuit board (PCB) installed in the inner space of the first base housing; and a plurality of lighting lamps installed on the PCB and arranged in parallel along a longitudinal direction of the first base housing in two rows, and wherein the sensor unit comprises: a sensor connecting line fixed on the first cover, extended along the longitudinal direction of the first cover between the two rows of the lighting lamps, and made of a conductive material; and a plurality of sensors connected to the sensor connecting line on the first cover, arranged at both sides from the sensor connecting line in a zigzag manner between the two rows of the lighting lamps, and configured to irradiate the radio wave to the outside of the vehicle and receive the radio wave reflected from the outside of the vehicle.

7. The distance measuring device for the vehicle of claim 6, wherein the first cover is formed by a light transmitting material.

8. The distance measuring device for the vehicle of claim 6, wherein
a sensor of the plurality of sensors includes a radar antenna.

9. A distance measuring device for a vehicle, comprising: a fixed housing configured to be mounted on an outer surface of the vehicle; and a sensor unit installed in the fixed housing, and configured to irradiate a radio wave to the outside of the vehicle, receive the radio wave reflected from the outside of the vehicle, and measure a distance between an object of the outside of the vehicle and the vehicle, wherein the fixed housing comprises: a first base housing having an inner space of which one side is open, and configured to be coupled to the vehicle; a first cover coupled to the one side of the first base housing; a printed circuit board (PCB) installed in the inner space of the first base housing; and a plurality of lighting lamps installed on the PCB and arranged in parallel along a longitudinal direction of the first base housing in two rows, and wherein the sensor unit comprises: a sensor connecting line fixed on a side of the first base housing, extended along the longitudinal direction of the first base housing between the two rows of the lighting lamps, and made of a conductive material; and a plurality of sensors connected to the sensor connecting line on the first base housing, arranged at both sides from the sensor connecting line in a zigzag manner between the two rows of the lighting lamps, and configured to irradiate the radio wave to the outside of the vehicle and receive the radio wave reflected from the outside of the vehicle.

10. The distance measuring device for the vehicle of claim 9, wherein the fixed housing is a garnish unit configured to be installed on a door or a fender.

11. The distance measuring device for the vehicle of claim 9, wherein
the sensor unit comprises a signal processing module, and a sensor of the plurality of sensors includes a radar antenna.

* * * * *